Aug. 15, 1933.　　　R. FRANCK　　　1,922,940

METHOD OF JOINING THE ENDS OF WIRE CLOTH

Filed July 9, 1932

Inventor
Rene Franck,

By Emil Bönnelycke
Attorney

Patented Aug. 15, 1933

1,922,940

UNITED STATES PATENT OFFICE 1,922,940

METHOD OF JOINING THE ENDS OF WIRE CLOTH

René Franck, Selestat, France

Application July 9, 1932, Serial No. 621,621, and in France April 27, 1931

3 Claims. (Cl. 245—10)

The present invention relates to a method of jointing the ends of wire cloth as used in the manufacture of paper and the like, so as to form an endless or circular band of cloth, for example a Fourdrinier wire, a cylinder or dandy roll cover.

Hitherto, in the making of such endless wire cloths the primary consideration has been to obtain a strong joint which is unlikely to break during use. To this end it is customary to braze or solder the section of each end of the cloth together by means of a transverse seam of soldering or brazing metal of a predetermined width, so that the interstices of the cloth over the area covered by the seam are filled up. Under such conditions the draining properties of the cloth are, therefore, to some extent impaired.

The seam referred to above is usually formed by conducting the soldering or brazing material along the transversal line section constituted by the close opposition of the two wire cloth ends.

The main object of the present invention is to provide a method of joining the ends of the wire cloth so that an endless cloth substantially homogeneous in nature as regards permeability and without seams results, permitting better draining than hitherto possible.

In order to more clearly describe the invention, there is shown in the accompanying drawing sections of wire cloth joined together in accordance with the present invention.

The method according to the invention consists in locating the warp wires of the two ends of the wire cloth in close contact position and passing the brazing or soldering material longitudinally of the cloth into the capillary channels formed by bringing the warp wire ends into contact.

Conveniently, the respective extremities or ends of the warp wires are either arch-butted one against the other or are contiguously located side by side or one above the other, the brazing or soldering material being led into and along the longitudinal capillary channels formed by the contiguous ends.

It will thus be seen that a secure jointing of the ends of the wire cloth is obtained without, however, substantially affecting the mesh of the cloth at the area of jointing, consequently draining is very little, if at all, affected.

Moreover, this method shows a degree of transparency nearly equivalent to that of a normal weft or transverse wire.

Preferably, a weft wire is located at the junction of the respective extremities or ends of the warp wires which are placed alternately under and over the weft wire, the latter serving as an intermediate support to which the warp wires are secured by the brazing or soldering material which, as before, is led longitudinally into the capillary channels formed by bringing the warp wire ends into contact with the weft wire.

Figure 1:
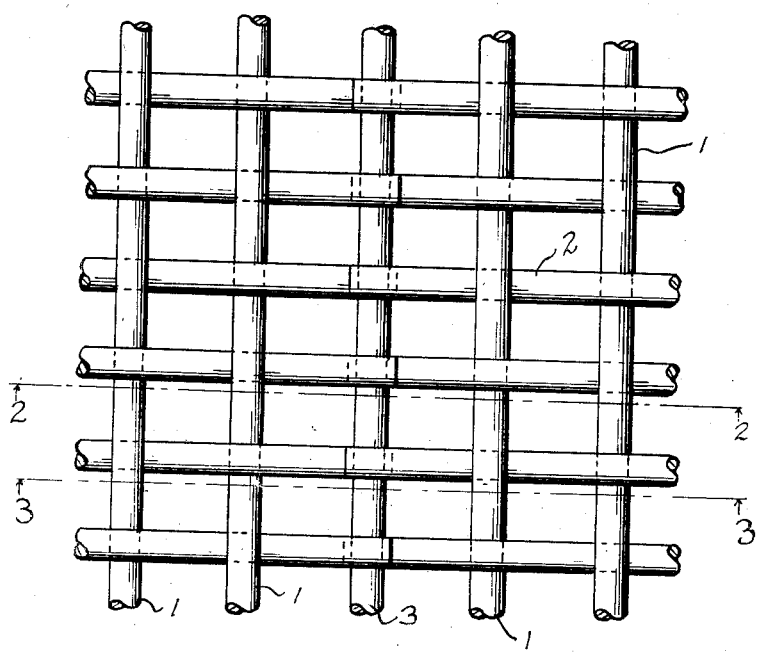
Figure 1 is a fragmentary view of a joint in a wire screen prepared in accordance with the present invention.
Figure 2:
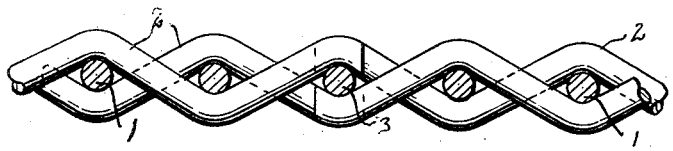
Fig. 2 is a sectional view taken on line 2—2 of Fig. 1.
Figure 3:
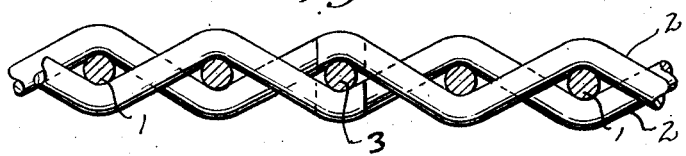
Fig. 3 is another sectional view taken on line 3—3 of Fig. 1.

As clearly shown in the drawing, a wire screen consisting of transverse weft wires 1 and warp wires 2 is joined to a corresponding section of screen. It will be noted that at the joint a weft wire 3 is positioned and the ends of the warp wires of the two screens are partially bent about the weft wire 3. One of the warp wires of one screen passes over the top of the weft wire 3, whereas the corresponding warp wire of the screen to be joined thereto passes underneath the weft wire 3. This construction is clearly shown in Figs. 2 and 3. After the warp wires of the two screens are so positioned relative to the weft wire 3, then the ends of the warp wires are secured to the weft wire 3 by solder or other suitable binding material.

With the preferred construction it will be seen that a highly perfect jointing is produced, the interstices over the jointed portion of the cloth corresponding to those of the body of the cloth, so that the composition of the latter, as regards its permeability, may be said to be homogeneous.

It will thus be seen that an endless cloth made according to the invention will be more permeable for draining purposes than those hitherto used.

Having now particularly described and ascertained the nature of my said invention and in what manner the same is to be performed, I declare that what I claim is:

1. A method of joining the ends of wire gauze of the type used in the manufacture of paper and consisting of woven warp wires and weft wires of a uniform size, comprising positioning the ends of the gauze together with the warp wires of each end in alignment, placing the extremities of alternate warp wires of one end on one side of a weft wire common to both of the ends of the gauze to be joined and of the same size as the other weft wires of the gauze, placing the extremities of alternate warp wires of the other end of the gauze in alignment with said alternate warp wires of the first end and on the opposite side of the common weft wire, and joining the extremities of all of the warp wires to said common weft wire.

2. A method of joining the ends of wire gauze of the type used in the manufacture of paper and consisting of woven warp wires and weft wires of a uniform size, comprising positioning the ends of the gauze together with the warp wires of each end in alignment, placing the extremities of the warp wires of one end of the gauze alternately on opposite sides of a common weft wire of a size equal to the other weft wires of the gauze, placing the warp wires of the other end of gauze alternately on opposite sides of said common weft wire in such a manner that the extremities of warp wires of one end of the gauze are on opposite sides of the common weft wire from the extremities of the respective aligned warp wires of the other end of the gauze, and joining the extremities of all of said warp wires to said common weft wire to form a continuous gauze in which the interstices adjacent the common weft wire are open.

3. An endless wire cloth comprising a length of wire gauze consisting of woven warp wires and weft wires, all of said weft wires being uniform in size and hardness, the ends of said wire gauze being placed together with the warp wires of each end in perfect alignment, a common weft wire of the same size and same degree of hardness as the other weft wires in the gauze, the extremities of the warp wires of one end of the gauze being alternately positioned on opposite sides of the common weft wire, and the extremities of the warp wires of the other end of the gauze being placed alternately on opposite sides of the common weft wire, the perfectly aligned warp wires of the two ends of gauze being positioned on opposite sides of the common weft wires, all of said warp wires being joined to the common weft wire and the interstices of the gauze adjacent the common weft wire being open.

RENÉ FRANCK.